United States Patent [19]
Yuyama

[11] Patent Number: 5,704,516
[45] Date of Patent: Jan. 6, 1998

[54] AMPULE DISPENSER

[75] Inventor: Shoji Yuyama, Toyonaka, Japan

[73] Assignee: Kabushiki Kaisha Yuyama Seisakusho, Osaka, Japan

[21] Appl. No.: 575,154

[22] Filed: Dec. 19, 1995

[30] Foreign Application Priority Data

Dec. 20, 1994 [JP] Japan ..................... 6-316548
Jul. 4, 1995 [JP] Japan ..................... 7-168909

[51] Int. Cl.⁶ ..................................... B23Q 7/12
[52] U.S. Cl. ............................. 221/164; 221/171
[58] Field of Search ....................... 221/163, 164, 221/166, 156, 168, 200, 311, 171, 173

[56] References Cited

U.S. PATENT DOCUMENTS 2,676,741  4/1954  Haynes ........................... 221/164
2,752,028  6/1956  Moskowitz et al. ............ 221/171

FOREIGN PATENT DOCUMENTS

1041372  10/1953  France ............................ 221/164

*Primary Examiner*—Kenneth Noland
*Attorney, Agent, or Firm*—Wenderoth, Lind & Ponack

[57] ABSTRACT

An ampule dispenser is capable of discharging ampules stored in a random manner one by one after arranging them in an orderly manner. A hole is formed in the bottom plate of an ampule housing. The bottom plate has a top surface sloping downward toward this hole. A push-up member adapted to be moved up and down through the hole has an ampule supporting portion on which a single ampule is placed at a time in a laid-down position. By moving the push-up member upward, the ampule supported on its supporting portion is raised to the highest position, where it slides down the sloping supporting portion and is discharged through a discharge port formed in the peripheral wall of the ampule housing.

19 Claims, 6 Drawing Sheets

AMPULE DISPENSER

BACKGROUND OF THE INVENTION

This invention relates to an ampule dispenser capable of automatically discharging ampules one by one.

Unexamined Japanese Utility Model Publication 5-86873 and Examined Japanese Utility Model Publication 6-14753 disclose ampule dispensers which can discharge a required number of ampules stored therein one by one.

When ampules stored in the cartridge of this type of device run short, a fresh supply of ampules have to be put in the cartridge.

Such a fresh supply of ampules have to be arranged one by one in an orderly manner So that they can be taken out smoothly. This work is extremely troublesome.

Examined Japanese Utility Model Publication 6-65329 discloses an injection dispenser comprising an upper inclined cylindrical member, a lower cylindrical member rotatably connected to the upper cylindrical member, an angle member provided around the inner periphery of the lower cylindrical member, and a bottom member closing the bottom opening of the lower cylindrical member and having a discharge port. Ampules that are sliding down from the upper cylindrical member into the lower cylindrical member are scraped up by the angle member and fed in the circumferential direction. They are then discharged through the discharge port.

Even if ampules are put in the upper cylindrical member in an unorderly manner, they are scraped up by the angle member and arranged neatly by the time they are discharged. Thus, there is no need to arrange ampules neatly when putting them in the upper cylindrical member.

But this device has a problem in that the discharge port tends to be clogged with ampules and that ampules are likely to be broken when passing through the discharge port. This is because ampules supported by the angle member slide down from the discharge port with the lower cylindrical member in rotation, so that the rear ends of the ampules are lifted up by the circumferentially moving angle member.

SUMMARY OF THE INVENTION

An object of this invention is to provide an ampule dispenser which can discharge ampules stored in an ampule housing in an unorderly manner one by one without the possibility of breaking them.

According to this invention, there is provided an ampule dispenser comprising an ampule housing in which a plurality of ampules are housed in an unorderly manner, and a push-up member for lifting the ampules one by one. The ampule housing comprises a bottom plate formed with a hole near its edge to receive the push-up member and sloping downward toward the hole, and a peripheral wall having a take-out port above the hole through which the ampules in the ampule housing are discharged. The push-up member is adapted to be moved up and down through the hole and has on its top surface an ampule supporting portion for supporting only one ampule at a time in a laid-down position, the supporting portion sloping downward toward the take-out port.

This dispenser may further comprise a small container connected to the take-out port and having a bottom plate sloping downward in the direction in which the ampules are discharged. The bottom plate is formed with a hole at lowest end thereof. A second push-up member is adapted to be moved up and down through the hole formed in the bottom plate of the small container. The second push-up member has an ampule supporting portion for supporting only one ampule at a time in a laid-down position, the ampule supporting portion of the second push-up member sloping in the same direction as the bottom plate of the small container. The small container has a peripheral wall formed with a discharge port disposed so as to be opposite to the ampule supporting portion of the second push-up member when the second push-up member is in its highest position. A sloping chute is connected to the discharge port.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Embodiments of this invention are now described with reference to the accompanying drawings.

Figure 1:
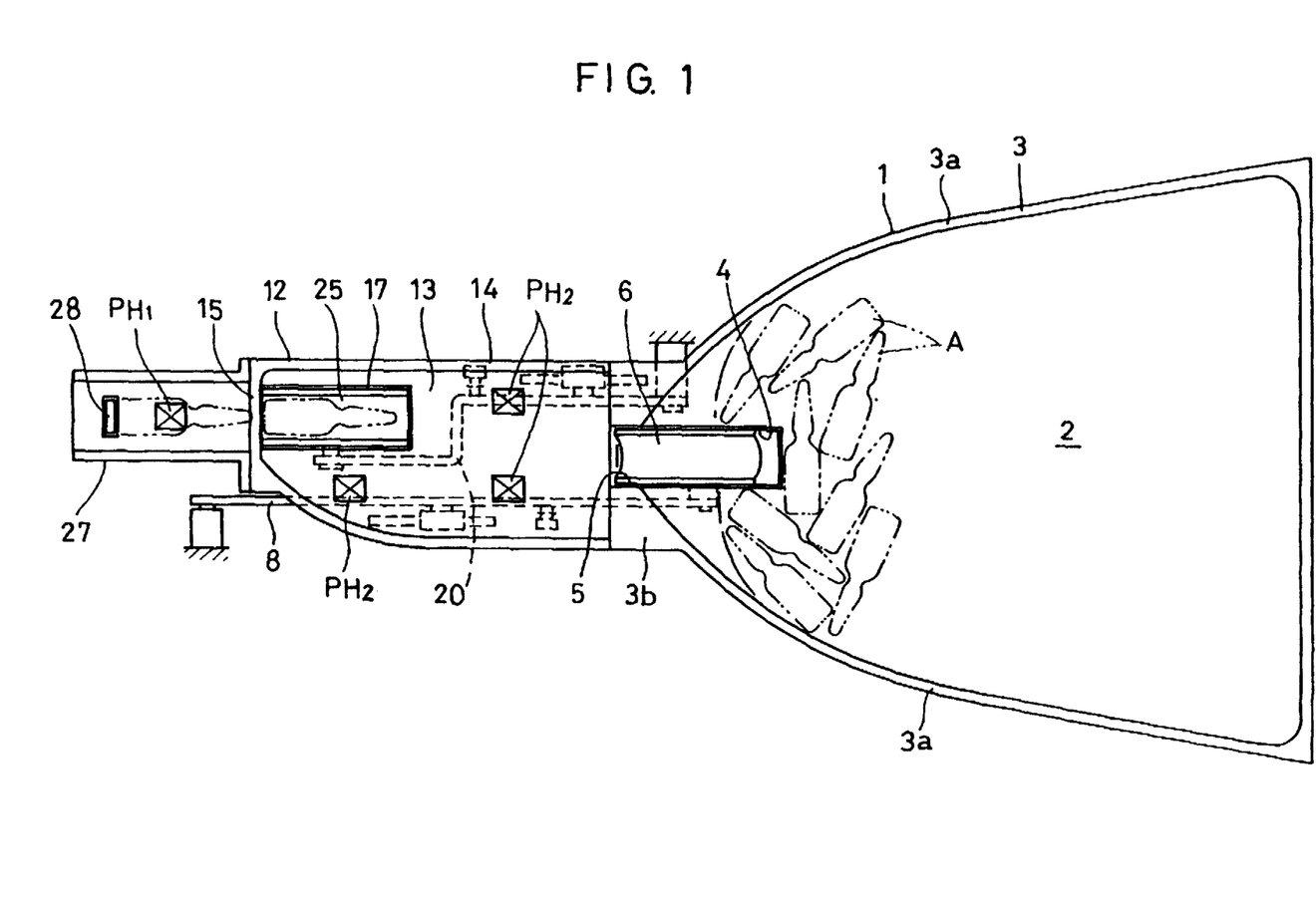
FIG. 1 is a plan view of a first embodiment of this invention.
Figure 2:
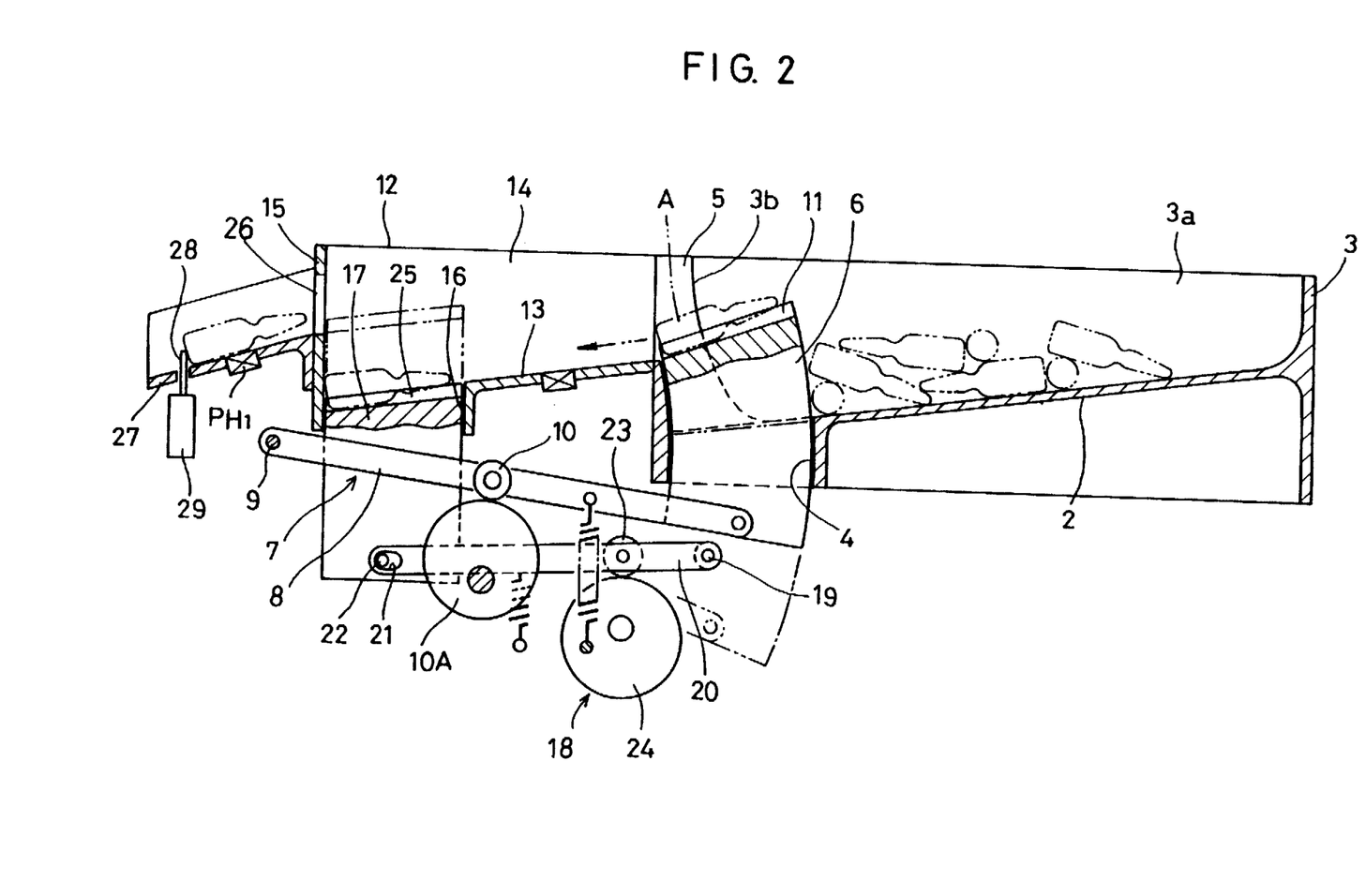
FIG. 2 is a vertical sectional front view of the same.

FIGS. 1 and 2 show the first embodiment. As shown, an ampule housing 1 has a bottom plate 2 and a peripheral wall 3. The bottom plate 2 slopes downward toward its leading end and is formed with a hole 4 in its lower end.

The peripheral wall 3 comprises a pair of side walls 3a and an end wall 3b provided between the leading ends of the side walls 3a. The distance between the side walls 3 narrows gradually toward their leading ends.

A takeout port 5 is formed in an upper portion of the end wall 3b.

The hole 4 is formed along the inner surface of the end wall 3b. A first push-up member 6 is inserted in the hole 4.

The first push-up member 6 is moved up and down by an actuator unit 7 comprising an arm 8 having one end thereof coupled to the bottom end of the push-up member 6 and the other end pivotally coupled to a pin 9, a cam follower 10 mounted on the arm 8 at an intermediate point, and a cam 10A provided under and kept in contact with the cam follower 10. By rotating the cam 10A in one direction, the arm 8 is pivoted, so that the push-up member 6 is moved up and down.

The push-up member 6 is fixedly coupled to the arm 8, so that the push-up member 6 and the end plate 3b have arched inner surfaces whose centers are both on the pin 9.

The push-up member 6 has a groove 11 in its top surface for receiving ampules one at a time in a laid-down position. The groove 11 confronts the takeout port 5 when the first push-up member 6 is moved up to its limit. In this state, the groove 11 slopes downward toward the takeout port 5.

A small container 12 is connected to the end wall 3b of the ampule housing 1. It comprises a bottom plate 13, a pair of side walls 14 and an end wall 15. The rear end of the bottom plate 13 is at substantially the same level as the bottom surface of the take-out port 5 of the ampule housing 1.

The bottom plate 13 slopes downward toward its leading end. A hole 16 is formed in the bottom plate 13 at its lower end. It is disposed along the inner surface of the end wall 15. A second push-up member 17 is inserted in the hole 16.

The second push-up member 17 is moved up and down by a second actuator unit 18 comprising an arm 20 pivotable about a pin 19 and formed with an elongated hole 21 in its free end, a pin 22 provided on the second push-up member 17 at its lower portion and inserted in the elongated hole 21, a cam follower 23 mounted on the arm 20 at an intermediate point, and a cam 24 provided under and kept in contact with the cam follower 23. By rotating the cam 24, the second push-up member 17 is moved up and down.

The second push-up member 17 has a groove 25 in its top surface to receive ampules one at a time in a laid-down position.

The groove 25 slopes downward toward the end wall 15. When the second push-up member 17 is moved up to its limit, the groove 25 confronts an outlet port 26 formed in the end wall 15.

A chute 27 is connected to the outlet port 26. It slopes downward toward its leading end, and has a stopper 28 at the leading end. The stopper 28 can be pushed into and out of the chute 27 by a cylinder 29. When pushed in the chute 27, it abuts and stops an ampule A sliding down in the chute 27.

The operation of the ampule dispenser of this embodiment will be described. A plurality of ampules A are stored in the ampule housing 1 in an unorderly manner. To eject an ampule, the first push-up member 6 and the second push-up member 17 are moved alternately up and down.

Since the bottom plate 2 of the ampule housing 1 slopes downward toward the hole 4, the ampules A congregate around the hole 4. By raising the first push-up member 6, one of the ampules A remains in the groove 11 of the first push-up member 6.

This ampule A is moved up by the first push-up member 6. When it is moved to its upper limit, the ampule A begins to slide down along the groove 11 and passes through the take-out port 5 into the small container 12.

Ampules A in the ampule housing 1 are received one by one in the groove 11 of a push-up member 6 because the groove 11 is of a size sufficient to receive only one ampule A. Ampules A are thus fed into the small container 12 one at a time.

Once in the small container 12, each ampule A slides down along the sloping bottom plate 13 toward the hole 16. When the second push-up member 17 descends to its lowest position, the ampule A is allowed to slide into the groove 25 of the second push-up member 17.

In this state, the second push-up member 17 is moved upward to its highest position, where the ampule A begins slides down along the sloping groove 25 and moves through the outlet port 26 into the chute 27.

The ampule A in the chute 27 is stopped by the stopper 28. When a sensor PH1 provided in the chute 27 detects the ampule A in the chute, the stopper 28 is retracted out of the feed path in the chute, so that the ampule A is discharged through its front end. Since the number of ampules discharged is counted by the sensor PH1, it is possible to discharge a predetermined number of ampules A accurately.

In the first embodiment, ampules A in the ampule housing 1 are fed first into the small container 12 and then from the small container into the chute 27. Thus, even if a plurality of ampules A are erroneously fed at a time by the first push-up member 6, it is possible to temporarily stock them in the small container 12 to feed them one by one into the chute 27.

In this case, such a plurality of ampules A are placed on the sloping bottom plate 13 so that their longitudinal direction coincides with that of the groove 25 of the second push-up member 17. Thus, when the second push-up member 17 is raised to its highest position, one and only one of the ampules A moves into its groove 25, so that ampules A are always discharged one at a time.

In the first embodiment, a plurality of sensors PH2 are provided on the bottom plate 13 of the small container 12. When at least two of them separately detect two ampules A, the first push-up member 6 is stopped so that no more ampules A are fed into the small container 12. With this arrangement, it is possible to prevent three or more ampules A from being fed into the small container 12 at the same time.

The side walls 14 of the small container 12 are spaced a distance sufficient to hold only one ampule A therebetween. One of the sensors PH2 is used to detect any ampule A held between the side walls 14. When the sensor keeps continuously detecting an ampule A for a predetermined time period, the first push-up member 6 is stopped.

This predetermined time period has to be longer than the time taken for the second push-up member to move up and down once.

By controlling the first push-up member 6 with the sensors PH2 in the above manner, it is possible to prevent ampules A from being stacked one on another in the small container 12 and thus to reliably discharge ampules one by one from the small container.

But this small container 12 may be omitted. Namely, the chute 27 may be directly connected to the take-out port 5 to feed ampules A in the ampule housing 1 directly into the chute 27.

Figure 3A:
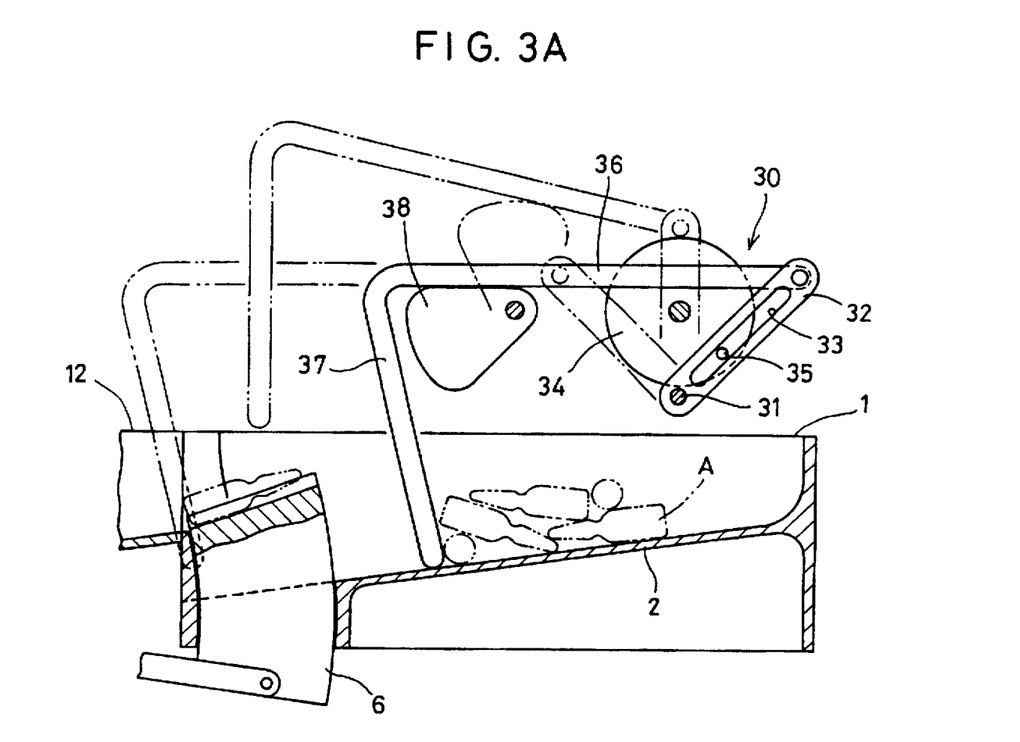
FIG. 3A is a sectional view of a second embodiment of this invention.

FIG. 3A shows a second embodiment of this invention. In this embodiment, a stirrer 30 is provided over the ampule housing 1 to stir ampules A around the first push-up member 6.

The stirrer 30 comprises arms 32 pivotably mounted on a pin 31, a disk 34 having pins 35 provided near its circumference and engaged in elongated holes 33 for the arms 32, and stirring arms 36 having one end thereof connected to the upper ends of the arms 32. The stirring arms 36 have bent free ends 37. The stirring arms 36 can be reciprocated longitudinally by pivoting the arms 32, and can be swung up and down by rotating cams 38. Thus, by pivoting the arms 32 and rotating the cams 38, the bent free ends 37 are retracted along the sloping top surface of the bottom plate 2 from the position where they are inserted in slits 39 formed in the end wall 3b (FIG. 3B) to a predetermined position while stirring the ampules A on both sides of the first push-up member 6. Then, stirring arms 36 are swung upward and then moved ahead until the bent ends 37 are received in the slits 39 in the end face again. This operation is repeated.

Figure 3B:
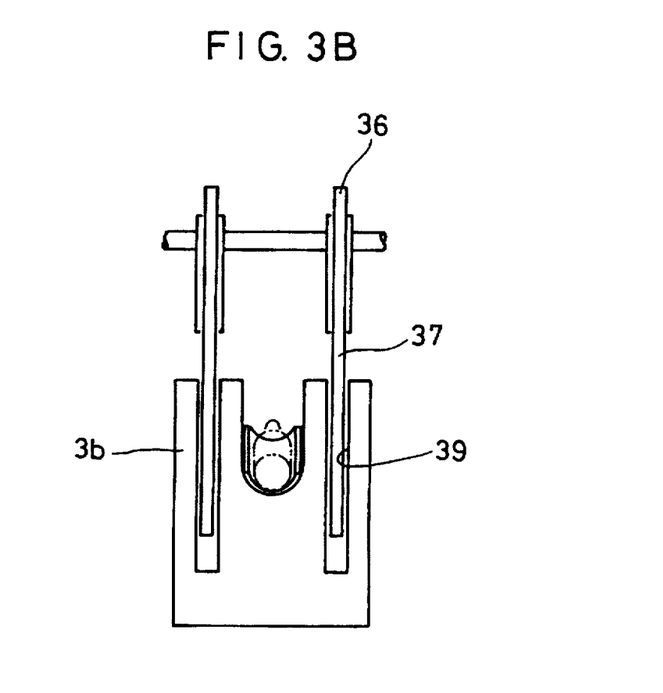
FIG. 3B is a side view of FIG. 3A.

By stirring the ampules A with the stirrer 30, they are arranged in the sloping direction of the bottom plate 2, so that the first push-up member 6 can more easily pick up each ampule in the groove 11. Thus, ampules can be discharged more smoothly.

Figure 4A:
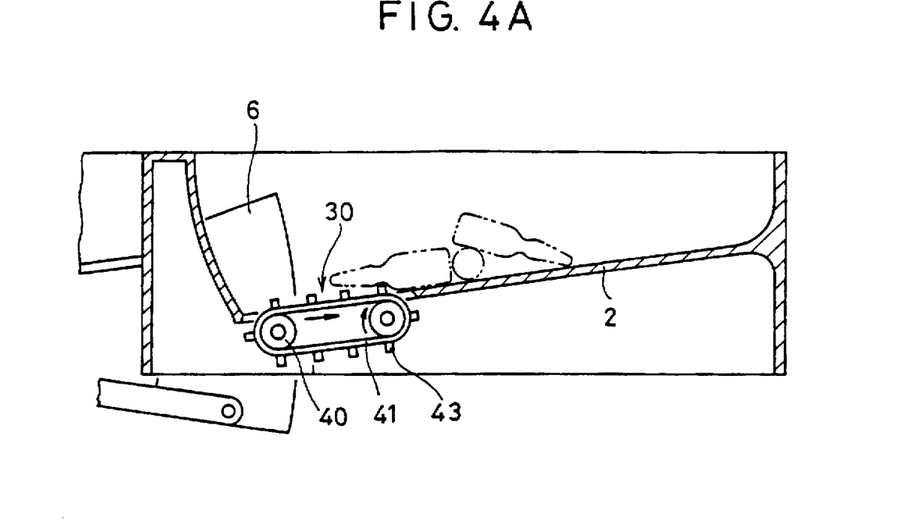
FIG. 4A is a plan view of a modified stirrer.
Figure 4B:
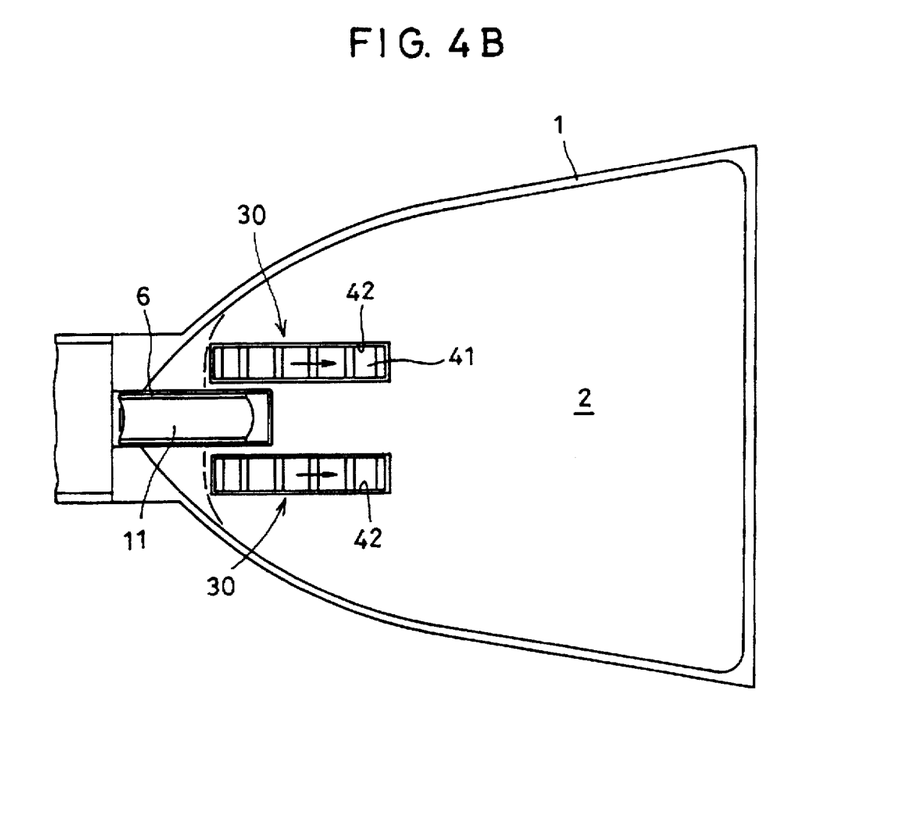
FIG. 4B is a sectional view of the same.

FIGS. 4A and 4B shows a modified stirrer 30. It comprises two pairs of pulleys 40 set in elongated holes 42 formed in the bottom plate 2 of the ampule housing 1 on both sides of the first push-up member 6, and two belts 41 put around the respective pulley pairs and having protrusions 43. The belts 41 are moved along the elongated holes 42 in the direction of arrows to stir ampules A with the protrusions 43. The ampules are thus arranged in the sloping direction of the bottom plate 2 by being brought into contact with the belts 41, so that the first push-up member 6 can more easily pick up each ampule in the groove 11. The first push-up member 6 is thus less likely to rise with no ampule received in the groove 11.

Figure 5A:
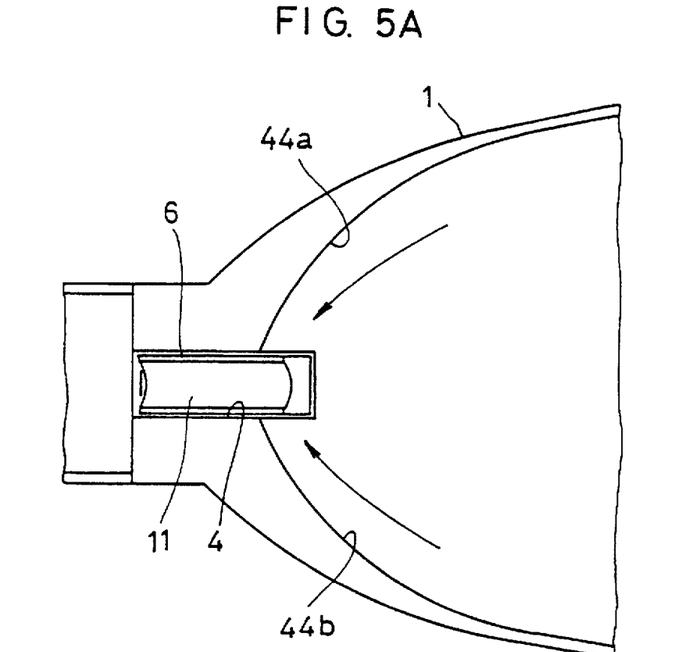
FIG. 5A is a plan view of a modified ampule housing.

As shown in FIG. 5A, inclined guide surfaces 44a and 44b may be formed on the inner surfaces of the side wall 3a of the ampule housing 1 at front end thereof to guide the ampules A toward the hole 4. With this arrangement, ampules A are gathered around the hole 4, so that they can be more reliably picked up in the groove 11 of the first push-up member 6. The first push-up member 6 is thus less likely to rise with no ampule received in its groove 11.

Figure 5B:
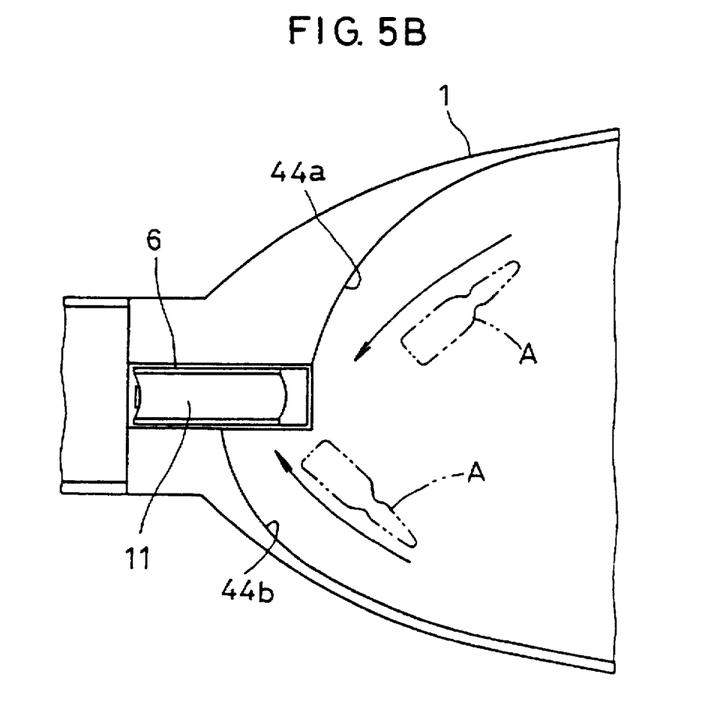
FIG. 5B is a plan view of a further modified ampule housing.

As shown in FIG. 5B, the guide surface 44a of the side wall 3a may be displaced longitudinally from the guide surface 44b of the other side wall 3b. With this arrangement, ampules A are guided toward the hole 4 by moving as shown by arrows in this figure, so that they flow more smoothly in the housing. Thus, they can be picked up in the groove 11 of the first push-up member with higher reliability.

Figure 6:
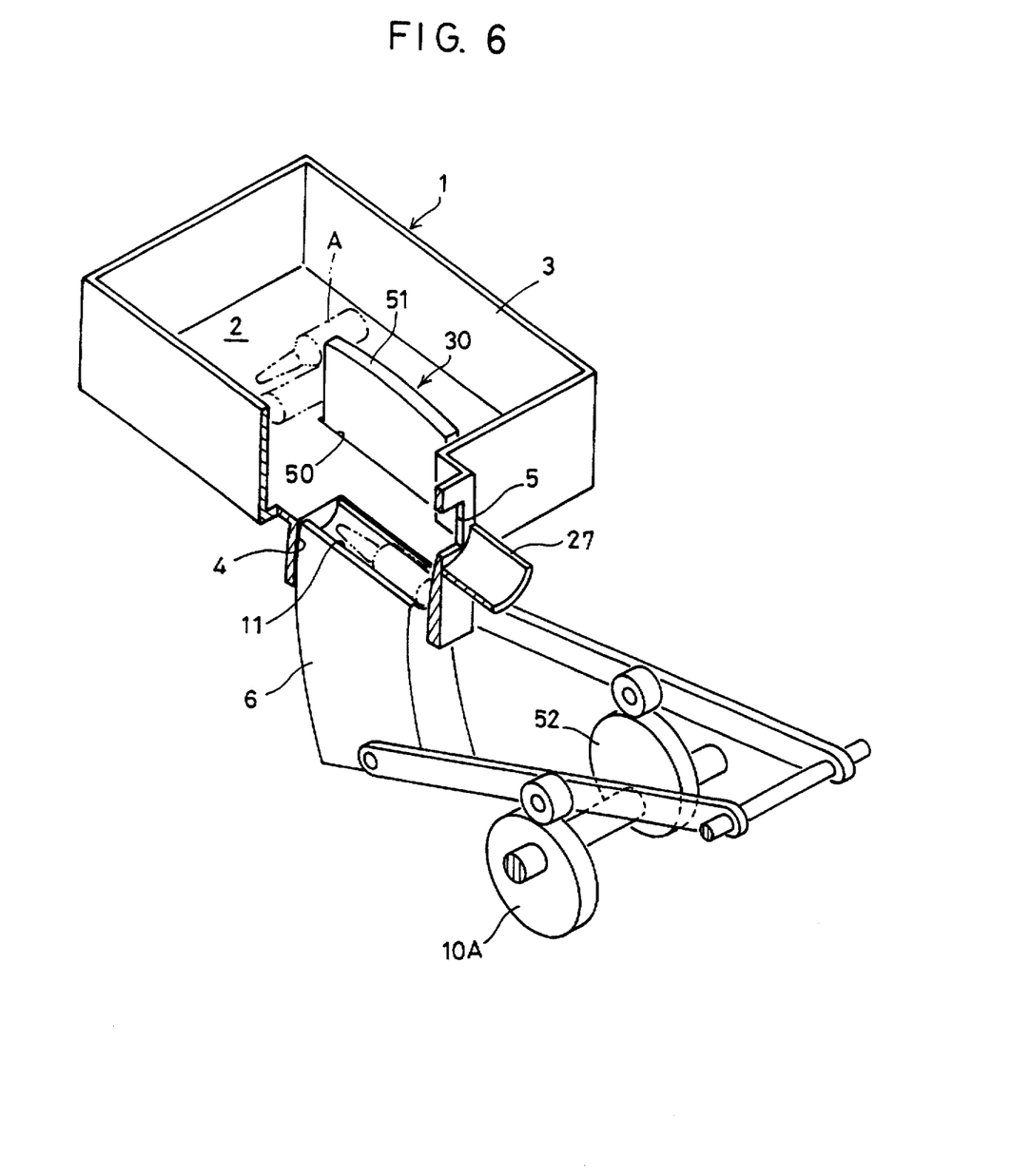
FIG. 6 is a partially cutaway perspective view of a third embodiment of this invention.

FIG. 6 shows a third embodiment. In this embodiment, a box-shaped ampule housing 1 is used. Its bottom plate 2 slopes downward toward a hole 4 formed in one end of the bottom plate 2.

The push-up member 6 is slidably inserted in the hole 4. It is moved up and down by rotating a cam 10A. While being moved up, an ampule A received in its top groove 11 slides down the sloping groove 11 through a take-out port 5 formed in the peripheral wall 3 of the ampule housing 1 into the chute 27.

In order to discharge ampules A smoothly and reliably, it is preferable to stir the ampules in the ampule housing with a stirrer 30.

The stirrer 30 of this embodiment comprises a plate-shaped stirring member 51 slidably inserted in an elongated hole 50 formed the bottom plate 2 of the ampule housing 1 near the hole 4, and a rotating cam 52 for moving the stirring member 51 up and down.

The stirring member 51 is preferably controlled so that it is moved up while the first push-up member 6 is descending and moved down while the latter is ascending.

By moving the stirring member 51 up and down, ampules A in the ampule housing 1 will never form a bridge, which can hinder smooth discharge of the ampules A.

In the third embodiment, ampules A are discharged through the take-out port 5 directly into the chute 27. But the small container 12 used in the first embodiment may be provided upstream of the chute to discharge ampules A first into the small container 12 and then from the container 12 into the chute 17.

Also, the stirring member 51 of the third embodiment may be provided on one side of the first push-up member 6 of the first embodiment.

The following are the advantages of this invention.

According to the invention claimed in claim 1, the push-up member adapted to be moved up and down through the hole formed in the bottom of the ampule housing has an ampule supporting portion for supporting an ampule in a laid-down position. The support portion slopes downward toward the ampule take-out port. Thus, ampules can be discharged one by one in an orderly row through the takeout port without the possibility of breakage.

Since the top surface of the bottom plate of the ampule housing slopes downward toward the hole, ampules in the housing move toward the hole, so that it is possible to completely discharge the ampules in the housing.

According to a further feature of the invention, ampules are fed one by one into the small container. The ampules in the small container are supported on the ampule supporting portion of the push-up member adapted to be moved up and down through the hole formed in the bottom plate of the small container. When the push-up member is moved to its highest position, the ampule on the supporting portion begins to slide to the chute because the supporting portion slopes downward toward the chute. Thus, ampules can be discharged one by one.

According to another feature, ampule-detecting sensors are provided under the bottom plate of the small container. When they detect ampules, the push-up member in the ampule housing is stopped. Thus, it is possible to prevent a plurality of ampules from being stacked one on another in the small container and thus to prevent more than one ampule from being supported simultaneously on the supporting portion of the push-up member. Ampules can be discharged one by one with high reliability.

According to a further feature, a stirrer is provided in the ampule housing to stir ampules near the push-up member. This makes it possible to support ampules more easily on the ampule supporting portion of the push-up member and thus reduce the possibility that the push-up member may rise with no ampule supported on its supporting portion.

According to a yet further feature, a stirring member extends through the bottom plate of the ampule housing near the push-up member. By moving this stirring member up and down, it is possible to prevent the ampules in the ampule housing from forming a bridge, so that ampules can be discharged smoothly and reliably.

According to another feature, the guide surfaces formed on the inner surfaces of the side walls of the ampule housing guide ampules toward the ampule-passing hole. Thus, ampules can be placed on the ampule supporting portion of the push-up member with higher reliability.

According to yet another feature, the guide surfaces are displaced from each other in the direction in which the bottom plate slopes. This makes it possible to place ampules on the support portion of the push-up member with even higher reliability.

What is claimed is:

1. An ampule dispenser comprising:
an ampule housing for housing a plurality of ampules in a disorganized manner, said ampule housing comprising a bottom plate having an edge and a hole in said bottom plate near said edge, said bottom plate sloping downward toward said hole, and a peripheral wall having a take-out port therein located above said hole in said bottom plate;
a push-up member received in said hole of said bottom plate such that said push-up member can move up and down through said hole, said push-up member having an ampule supporting portion on a top surface thereof capable of supporting only one ampule at a time in a laid-down position and sloping downward toward said take-out port when said push-up member is in an upper position, whereby ampules can be lifted one by one from said housing and discharged through said take-out port;

a container smaller than said housing connected to said take-out port, said container having a bottom plate sloping downward in an ampule discharge direction, said bottom plate having a lowest end and a hole at said lowest end, and a peripheral wall having a discharge port and a sloping chute connected with said discharge port; and a second push-up member received in said hole of said container such that said second push-up member can move up and down in said hole of said container, said second push-up member having an ampule supporting portion capable of supporting only one ampule at a time in a laid-down position, said ampule supporting portion of said second push-up member sloping in the same direction as said bottom plate of said container, and said ampule supporting portion of said second push-up member having a highest position in which said ampule supporting portion of said second push-up member is located opposite to said discharge port.

2. The dispenser of claim 1, and further comprising a plurality of sensors for detecting ampules on said bottom plate of said container and a control means for stopping said push-up member of said ampule housing if at least two of said plurality of sensors separately detect ampules on said bottom plate of said container.

3. The dispenser of claim 2, and further comprising a stirrer in said ampule housing for stirring ampules near said push-up member.

4. The dispenser of claim 3, wherein said stirrer comprises a stirring member extending through said bottom plate of said ampule housing near said push-up member and capable of moving up and down through said bottom plate.

5. The dispenser of claim 2, wherein said ampule housing comprises a pair of guide surfaces on side walls on opposite sides of said push-up member for guiding ampules toward said hole formed in said bottom plate of said ampule housing.

6. The dispenser of claim 5, wherein said guide surfaces are displaced relative to each other in the direction in which said bottom plate of said ampule housing slopes.

7. The dispenser of claim 1, and further comprising a stopper movable between one position in which said stopper protrudes into said sloping chute for stopping an ampule in said chute and another position in which said sloping chute is unblocked.

8. The dispenser of claim 1, and further comprising a stirrer in said ampule housing for stirring ampules near said push-up member.

9. The dispenser of claim 8, wherein said stirrer comprises a stirring member extending through said bottom plate of said ampule housing near said push-up member and capable of moving up and down through said bottom plate.

10. The dispenser of claim 1, wherein said ampule housing comprises a pair of guide surfaces on side walls on opposite sides of said push-up member for guiding ampules toward said hole formed in said bottom plate of said ampule housing.

11. The dispenser of claim 10, wherein said guide surfaces are displaced relative to each other in the direction in which said bottom plate of said ampule housing slopes.

12. An ampule dispenser comprising:

an ampule housing for housing a plurality of ampules in a disorganized manner, said ampule housing comprising a bottom plate having an edge and a hole in said bottom plate near said edge, said bottom plate sloping downward toward said hole, and a peripheral wall having a take-out port therein located above said hole in said bottom plate;

a push-up member received in said hole of said bottom plate such that said push-up member can move up and down through said hole, said push-up member having an ampule supporting portion on a top surface thereof capable of supporting only one ampule at a time in a laid-down position and sloping downward toward said take-out port when said push-up member is in an upper position, whereby ampules can be lifted one by one from said housing and discharged through said take-out port; and a stirrer in said ampule housing for stirring ampules near said push-up member.

13. The dispenser of claim 12, wherein said stirrer comprises a stirring member extending through said bottom plate of said ampule housing near said push-up member and capable of moving up and down through said bottom plate.

14. The dispenser of claim 13, said ampule housing comprises a pair of guide surfaces on side walls on opposite sides of said push-up member for guiding ampules toward said hole formed in said bottom plate of said ampule housing.

15. The dispenser of claim 14, wherein said guide surfaces are displaced relative to each other in the direction in which said bottom plate of said ampule housing slopes.

16. The dispenser of claim 12, said ampule housing comprises a pair of guide surfaces on side walls on opposite sides of said push-up member for guiding ampules toward said hole formed in said bottom plate of said ampule housing.

17. The dispenser of claim 16, wherein said guide surfaces are displaced relative to each other in the direction in which said bottom plate of said ampule housing slopes.

18. An ampule dispenser comprising:

an ampule housing for housing a plurality of ampules in a disorganized manner, said ampule housing comprising a bottom plate having an edge and a hole in said bottom plate near said edge, said bottom plate sloping downward toward said hole, and a peripheral wall having a take-out port therein located above said hole in said bottom plate;

a push-up member received in said hole of said bottom plate such that said push-up member can move up and down through said hole, said push-up member having an ampule supporting portion on a top surface thereof capable of supporting only one ampule at a time in a laid-down position and sloping downward toward said take-out port when said push-up member is in an upper position, whereby ampules can be lifted one by one from said housing and discharged through said take-out port; and a pair of guide surfaces on side walls on opposite sides of said push-up member for guiding ampules toward said hole formed in said bottom plate of said ampule housing.

19. The dispenser of claim 18, wherein said guide surfaces are displaced relative to each other in the direction in which said bottom plate of said ampule housing slopes.

\* \* \* \* \*